March 11, 1952  B. G. CARLSON ET AL  2,589,050
METHOD OF AND APPARATUS FOR MAKING PINKING SHEARS
Filed May 19, 1947  6 Sheets-Sheet 1

FIG. 1.

INVENTORS
BERT G. CARLSON
BY JOHN BORCZ
Blair, Curtis & Hayward
ATTORNEYS

March 11, 1952 B. G. CARLSON ET AL 2,589,050
METHOD OF AND APPARATUS FOR MAKING PINKING SHEARS
Filed May 19, 1947 6 Sheets-Sheet 2

INVENTORS
BERT G. CARLSON
BY JOHN BORCZ
Blair, Curtis & Hayward
ATTORNEYS

March 11, 1952     B. G. CARLSON ET AL     2,589,050
METHOD OF AND APPARATUS FOR MAKING PINKING SHEARS
Filed May 19, 1947     6 Sheets-Sheet 3

INVENTORS
BERT G. CARLSON
JOHN BORCZ
BY
Blair, Curtis & Hayward
ATTORNEYS

Patented Mar. 11, 1952

2,589,050

UNITED STATES PATENT OFFICE 2,589,050

METHOD OF AND APPARATUS FOR MAKING PINKING SHEARS

Bert G. Carlson, Gates Mills, and John Borcz, Fremont, Ohio, assignors to The Henkel-Clauss Company, Fremont, Ohio, a corporation of Ohio Application May 19, 1947, Serial No. 749,002

10 Claims. (Cl. 76—104)

This invention relates to a method of making pinking shears, particularly a method of forming teeth therein, and to apparatus for accomplishing the same.

Heretofore, the manufacture of pinking shears has customarily been commenced by roughing out teeth in a blade blank, for example, as described in U. S. Patent No. 2,286,874 to David L. Schwartz, by whirling the blank past a stationary row of V-shaped cutting tools. Such methods are unsatisfactory in that it is extremely difficult to align the separate tools perfectly; then, as the tools are used, differences in their rates of wear necessitate their frequent readjustment. Moreover, since the tool is stationary, the depth of cut on each pass is limited and considerable time is required for cutting.

The rough blanks next are paired and lapped together to wear away portions of the teeth and allow them to intermesh without clashing. This lapping operation must be accomplished by hand—a tedious and rather erratic procedure, or by complicated automatic machinery, such as that described in U. S. Patent No. 1,981,935 to Curtis Weidauer.

Accordingly, among the objects of this invention is the provision of a method of making pinking shears whereby there are formed in a single, rapid and economical operation, teeth sufficiently accurate for proper cutting without subsequent lapping. Another object is that of providing apparatus for efficiently performing said method. Other objects will be in part pointed out and in part apparent hereinafter.

The invention accordingly consists in the features of construction, combinations of elements, arrangements of parts and methods of operations, as will be exemplified in the structures and sequences of steps to be hereinafter indicated and the scope of the application of which will be set forth in the following claims.

In the accompanying drawings in which is shown a possible embodiment of various features of this invention.

Manufacture of pinking shears according to the present method is normally commenced with strips of carbon steel 1″ wide and ¼″ thick. These are sheared into pieces approximately 10″ long, square at one end and tapering for approximately 4″ to a point at the other. These pieces are then heated and forged into shear blanks of substantially the desired ultimate shape. The forged blanks are then pickeled, normalized and annealed. Next the flash is trimmed off and the blanks are ground to proper size, polished and plated. Pivot holes are then drilled in the blanks.

Figure 10:
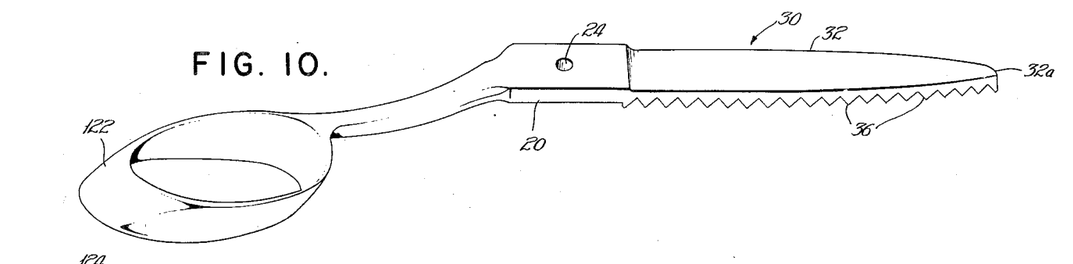
Figure 10 is a perspective view of one of a pair of shears formed in accordance with this invention.
Figures 11, 12:
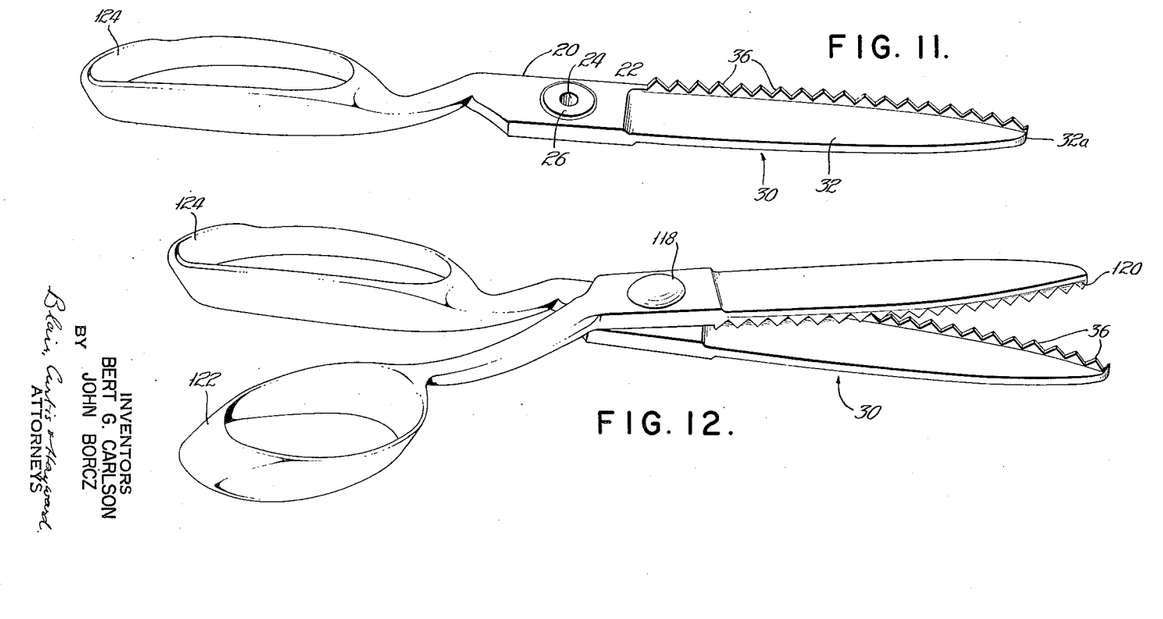
Figure 11 is a perspective view of the other of said pair of shears.
Figure 12 is a perspective view of the pair of shears in assembled and operative relation.

The blanks are now in the form shown in Figures 10 and 11, except that the teeth have not been cut. Except for their bow handles 122 and 124, the blanks for mating shears are identical. Each comprises a central hub portion 20, having on its inner side a circular boss 22 and a pivot hole 24 through hub portion 20 at the center of boss 22. The top 26 of boss 22 which forms the bearing face of the shear is flat and parallel to the plane of the shear. The axis of pivot hole 24 is at right angles to bearing face 26.

Figures 4, 5:
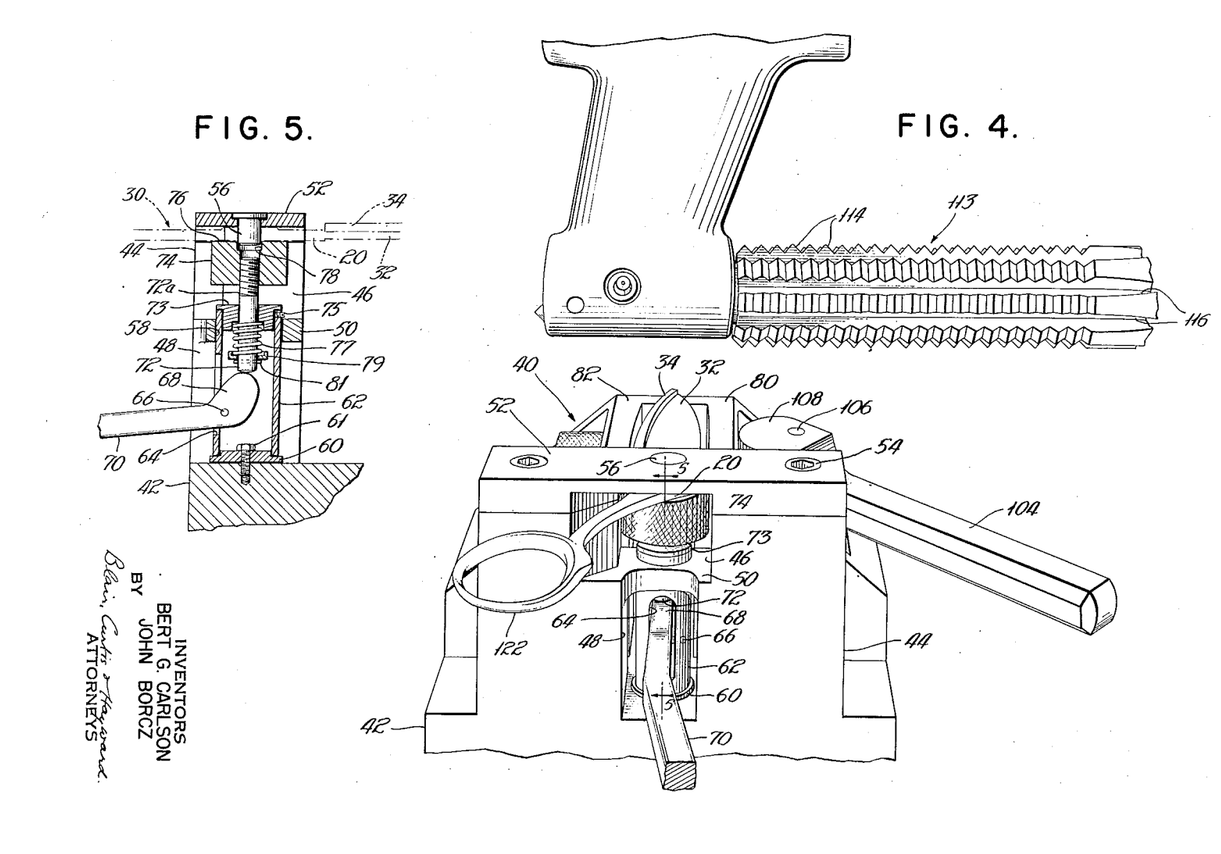
Figure 4 is a fragmentary perspective view of the machine, with a shear blank mounted thereon preparatory to cutting teeth in said blank.
Figure 5 is a fragmentary sectional view along line 5—5 of Figure 4.

Extending from hub portion 20 is a jaw portion generally indicated at 30 comprising a flat blade 32 parallel to the plane of the shear and an integral flange 34 extending from one side of blade 32 at substantially right angles thereto (see Figure 4). In the particular shear illustrated, blade 32 is of uniform width throughout the half of its length nearer hub portion 20, but the outer or right hand half of blade 32 is convexly tapered at either side to a rounded tip 32a. Thus the inner one-half of the length of flange 34 is straight while the outer one-half is substantially arcuately shaped. Flange 34 is of such height that the plane of its outer surface is beyond that of bearing surface 26 by a distance at least equal to one-half the height of the teeth to be formed in said flange.

The teeth 36 are cut in flange 34 by a machine of the type shown in Figures 1–6. This may comprise a standard horizontal milling machine (shown only fragmentarily) with a fixture, indicated generally at 40, and cutting tool, indicated generally at 113.

Fixture 40 includes a rectangular base 42 which is secured to the rotary horizontal table of the milling machine (not shown) in any suitable manner. At one end of base 42 is fixedly mounted an upstanding rectangular block 44 which is generally H shaped with upper and lower openings 46 and 48, respectively and a horizontal partition 50 therebetween.

Upper opening 46 is closed at the top by a cap 52 extending across block 44 and secured thereto as by bolts 54. A cylindrical pin 56, fixedly mounted on cap 52, extends downwardly therefrom into upper opening 46; pin 56 is adapted to project into pivot hole 24 of a shear blank and laterally center the blank. The fixture is so mounted on the rotary table of the milling machine that the axis of pin 56 coincides with that of the table so that the shear blank during cutting rotates about the axis of pivot hole 24, which is the pivotal axis of the shear when ultimately mounted with a mate for cutting.

Partition 50 (Figures 4 and 5) has a hole 58 therethrough, which is coaxial with pin 56. A tube 62 having an outwardly facing vertical slot 64 is rotatably mounted in lower opening 48 with its lower end supported by a bearing plate 60 secured on base 42 by a bolt 61, and its upper end projecting through hole 58. A pin 66 is supported transversely of tube 62 to serve as pivot for an eccentric cam 68 having fixed thereto a handle 70 which projects through slot 64 for manual rotation of cam 68 about pin 66. A bushing 73 secured in the upper end of tube 62 by a set screw 75 axially and reciprocably supports in tube 62 a follower bolt 72 which is urged downwardly against the face of cam 68 by a coil spring 77 compressed between bushing 73 and a dish 79 supported on bolt 72 by a pin 81 therethrough. As handle 70 is moved down, follower 72 is raised by cam 68 against the resistance of spring 77.

The upper portion 72a of bolt 72, which projects above the upper end of tube 62, even in the bolt's position of maximum downward travel, is threaded to receive a large, knurled nut 74. The upper face 76 of nut 74 is adapted to bear against the outer side of the hub portion 20 of a shear blank to press the bearing face 26 of the blank upwardly against the underside of cap 52. Thus nut 74 may be readily adjusted to such position on bolt 72 as to provide a space between the upper face 76 of nut 74 and the lower face of cap 52 equal to the thickness of the hub portion 20 of a shear blank when handle 70 is depressed to raise nut 74. A hole 78 is provided in the top of nut 74 to receive the lower end of pin 56, which projects beyond the bottom of hub portion 20 when the hub is placed between cap 52 and nut 74.

Figure 3:
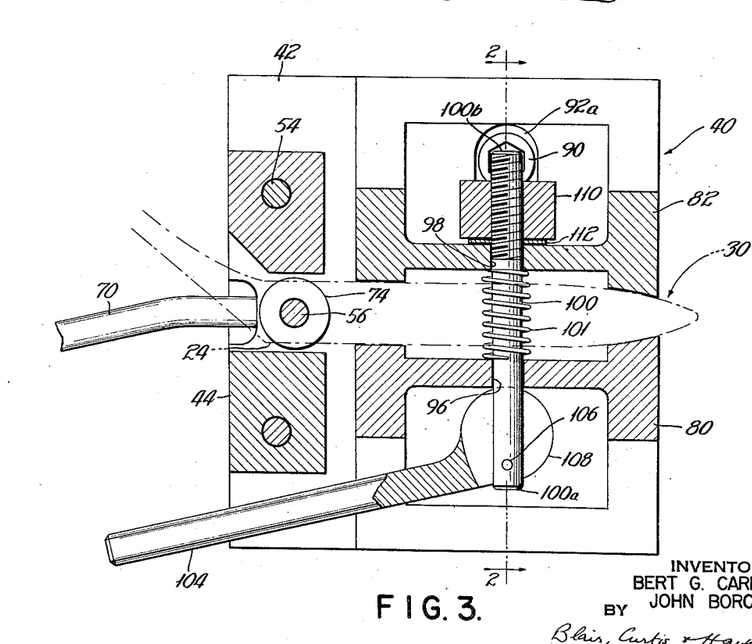
Figure 3 is a horizontal sectional view taken along line 3—3 of Figure 2.

Occupying most of the remainder of the top area of base 42 and secured thereto is a vise comprising a semi-fixed jaw 80 and a sliding jaw 82, as shown in Fig. 3, having opposed faces contoured to fit the jaw portion 30 of a shear blank. As shown most clearly in Figure 2, jaw 80 is secured on base 42 by a single socket-head bolt 84 which projects through a hole 86 in jaw 80 and is threaded into base 42. The head of bolt 84 is counter sunk in the enlarged upper portion 86a of hole 86, and a washer 88 may be placed between the head of bolt 84 and the shoulder thus formed in hole 86. Jaw 80 is capable of pivoting about bolt 84; once initially aligned properly, however, it is fixed in position by tightening bolt 84.

Jaw 82 is slidably secured on base 42 by a single socket-head bolt 90 which extends through a transverse slot 92 in jaw 82 and is threaded into base 42. The upper portion 92a of slot 92 is slightly enlarged to receive the counter-sunk head of bolt 90, and a washer 94 may be placed between the head of bolt 90 and the shoulder thus formed. Bolt 90 is so adjusted as to allow jaw 82 to be moved freely toward and from jaw 80.

Jaws 80 and 82 are provided respectively with registering, longitudinally centered, transverse holes 96 and 98, respectively, and a bolt 100 extends therethrough. End 100a of bolt 100 has a hole 102 extending therethrough which receives a pin 106. The opposite ends of this pin extend through and pivotally support the spaced sides of a forked cam 108 (Figure 6) formed on the inner end of a handle 104. The opposite end 100b (Figure 2) of bolt 100 is threaded and bears a large, knurled nut 110 and a washer 112. A coil spring 101 around bolt 100 is compressed between jaws 80 and 82 and urges them apart. As handle 104 (Figure 6) is moved, cam 108, which bears against the outer surface of jaw 80, pulls or relaxes bolt 100 which causes jaw 82 to be moved toward jaw 80 or freed for movement away from jaw 80 by spring 101. Nut 110 is so adjusted on bolt 100 that the spacing between jaws 80 and 82 equals the width of the jaw portion 30 of a shear blank when handle 104 is moved to its jaw-closing position. Since jaw 82 is capable of pivoting as well as reciprocating with respect to bolt 90 (see Figure 2), jaw 82 is automatically aligned with jaw 80 and with the adjacent edge of the shear blank as the two jaws grip the blank.

Figure 6:
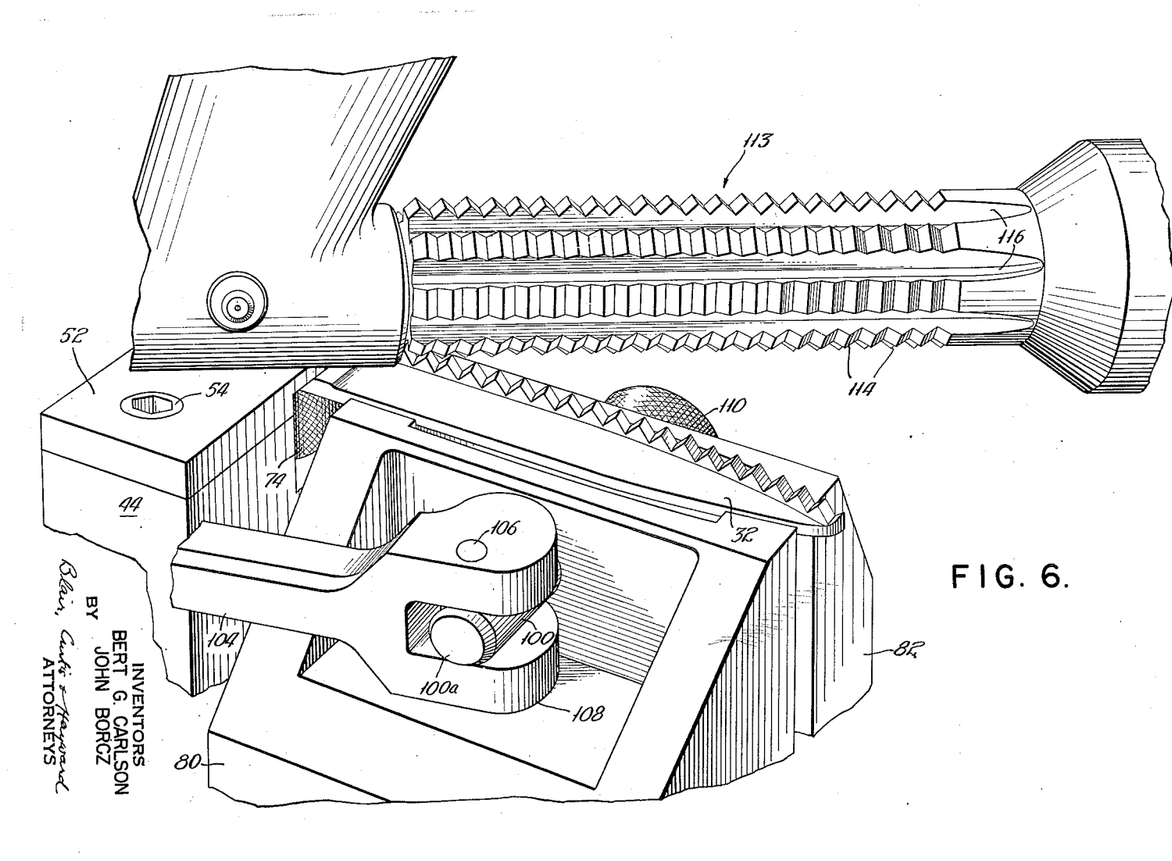
Figure 6 is a fragmentary perspective view of the machine and blank during the teeth-forming operation.

As shown in Figure 6, jaws 80 and 82 are of such height that their top surfaces fall just short of being flush with the parallel upper face of the blade 32 of a shear blank properly positioned in the fixture. When mounting a shear blank in the fixture, the operator sights along blade 32 and manually aligns it with the top edges of the jaws to correct any slight warping of the blank such as may have been occasioned in annealing or normalizing.

To mount the blank it is first inserted through opening 46 (Figure 4) and its pivot hole is centered on pin 56. In a single motion, handle 70 is lowered to raise nut face 76 into clamping engagement with the blank; then the blade 32 of the blank is aligned with the tops of jaws 80 and 82 as described, and, with a single motion of handle 104, the vise jaws 80 and 82 are closed to clamp the jaw portion 30 of the blank. The shear blank may thus be mounted in place in the fixture in but a few seconds' time and is securely held in precisely the correct position, to rotate about its ultimate pivotal axis in a plane perpendicular to said axis. The height of the blank relative to the fixture, and therefore the height of the blank relative to the cutting tool is gauged from the bearing face 26 (see Figure 11) of the blank, since bearing face 26 is always in abutment with the fixed underside of cap 52. Thus the teeth cut in the shear are positioned with reference to the ultimate bearing face of the shear—a characteristic of the present fixture which contributes substantially to the accuracy achieved.

Figure 1:
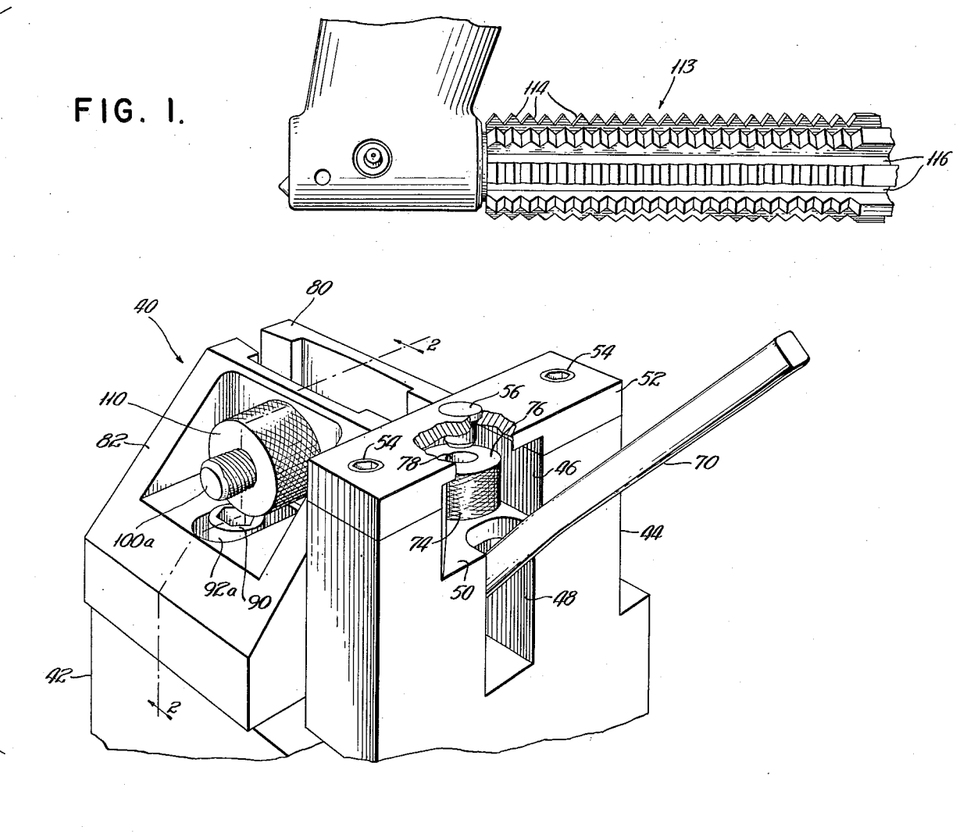
Figure 1 is a fragmentary perspective view of a machine embodying features of my invention.
Figure 2:
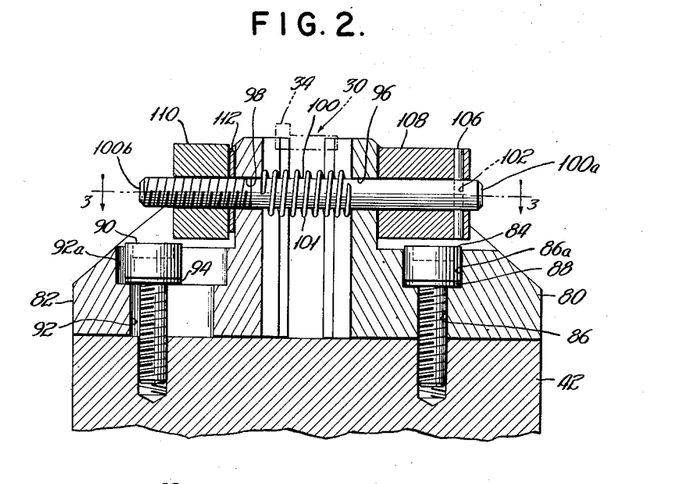
Figure 2 is a fragmentary vertical sectional view of the machine, taken generally along line 2—2 of Figure 1.

The novel cutting tool employed as shown in Figure 1, is generally cylindrical, having a series of identical circumferential serrations 114, whose projecting portions are, in axial section, of isosceles triangular shape. To achieve proper cutting action, the tool is segmentally relieved by a plurality of spaced longitudinal flutings 116. Each transverse section of the tool from one of its circumferential valleys to an adjacent valley is, in effect, an angular cutting wheel; the tool thus in effect comprises a coaxial stack of identical cutters. The tool has an axial bore with a communicating longitudinal slot or keyway (not shown) and is mounted on and keyed to the arbor of the milling machine in the usual manner. When mounted, the horizontal axis of the tool intersects the vertical axis about which shear blank pivots during cutting (see Figure 7).

As the tool is rotated about its axis, the knee of the machine is cranked up so that the plane of rotation of the upper edge of flange 34 of the blank is carried to a position tangent to the under side of the rotating tool. The table is then rotated to swing the blank past the tool and cause cutting of the teeth to fractional depth. Then the knee is cranked up slightly higher and the table is rotated back past the tool to cut the teeth slightly deeper, and so on (see Figure 6). About four cutting passes have proven sufficient; on the final or finishing cut, it is preferable to remove only about .001". The method is of course readily adaptable to automatic table feed, if a milling machine affording such operation is used.

The machine's vertical feed vernier (not shown) is preferably calibrated for zero when the knee is so positioned that the plane of the bearing face 26 of the shear blank is, illustratively, .0005" above the mid-point of the serrations along the bottom center line of the tool. In cutting, the knee is moved up until the vernier finally reads zero; thus, the plane of the bearing face 26 of the finished shear passes .0005" above the center of the teeth. When assembled and with their bearing faces 26 in abutment, a pair of shears whose teeth are cut to such depth will have a tooth clearance of approximately .001".

After cutting one of a mating pair of shears, before cutting the other, the table of the machine is moved in either direction along the axis of the tool a distance equal to one-half the width of one of the tool's serrations, so that when the shears are paired and mounted their teeth will be staggered for intermeshing.

Since the tool has, in effect, as many cutting edges as it has flutings, it wears much more slowly than do single tools of the type described in said Patent No. 2,286,874 to Schwartz; moreover, since the present tool is formed of a single piece of metal, its wear is uniform throughout.

Figures 7, 8, 9:
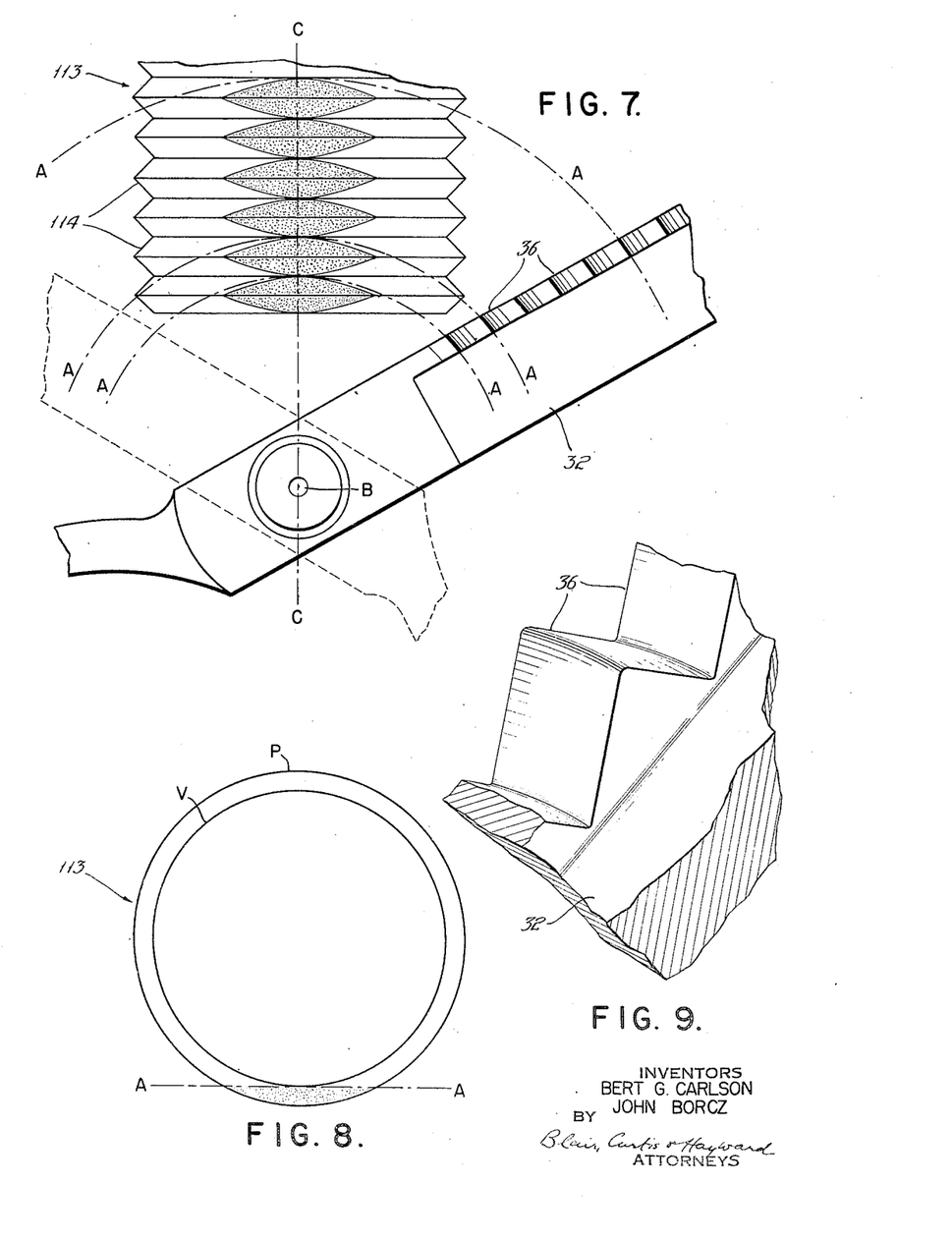
Figure 7 is a fragmentary and partially diagrammatic top plan view of the machine and blank during the forming operation.
Figure 8 is a diagrammatic view at right angles to that of Figure 7.
Figure 9 is a fragmentary perspective view of the jaw of a shear after teeth have been cut therein.

Since the shear moves in a circular path past the cutting tool, the surfaces of its teeth 36 will be not planar, but arcuate; all of the surfaces having a common axis: the pivotal axis of the shear (see Figure 9). Thus, although the intermeshing teeth of a pair of shears contact each other throughout their entire thickness (as may be visualized from Figure 12), there is no clashing; their action rather is that of tangential surfaces of revolution moving about a common axis which corresponds with the axis about which they were generated, and accordingly presenting fronts of infinite thinness.

In cutting only that portion of the rotating cylindrical cutting tool along its bottom center line is effective in shaping the teeth. This can be seen from Figures 7 and 8. In Figure 7, the paths of rotation of the peaks of the teeth 36 about the pivot B are represented by the arcs A. In Figure 8, which is a view endwise of the tool, these arcs A are straight lines (A—A). The concentric circles P and V represent a peak and valley, respectively, of the tool; the line A—A is tangential to the circle V, since the peaks of the teeth are formed by the valleys of the tool. The entire height of the teeth is below the line A—A (Figure 8). Thus the only portion of the tool which can possibly contact the teeth at any instant is that portion which is then within the shaded area below line A—A (Figure 8). Viewed in plan in Figure 7, these shaded portions appear as double hyperbolas. As shown, the arcs of each of the lines A—A indicating paths of peaks of the teeth are of sufficient radius to clear both ends of the shaded portions. Thus the peaks are contacted by the cutting tool only along the bottom center line C—C of the tool.

However, as seen in Figure 7, the arcs of the teeth closer to the pivotal axis are of sharper curvature and thus more closely approach contact with the ends of the shaded portions. It can be shown that, for 90° teeth (teeth whose height is one-half their width at the base) the minimum spacing between the pivot point of the shear and the face of the first tool is equal to the radius of the cutting tool at its peaks. Teeth closer to the pivot point than this minimum spacing would contact the tool at points other than at its center line C—C, and would be cut down so that they would not meet with adjacent teeth when mounted in the shears. Since, in practically all types of pinking shears in current use, the spacing of the first tooth from the pivot is substantially greater than 5/8", a satisfactory radius for the tool, this factor does not present any difficulty.

After the teeth have been formed in the shear blank, it is removed from the cutting machine, which involves merely single motions of handles 104 and 70.

The shears are then paired and mounted by means of a bolt 118 (Figure 12) passing through the pivot hole 24 of each shear and secured by means of a tapered nut over a spring washer (not shown). The jaws are then bowed and twisted in the usual manner. A bevel edge 120 is ground on the cutting face of the teeth. The shear handles 122, 124 may then be japanned, if desired, and the remaining portion of the shear buffed; the blades may be finally readjusted to correct any slight warping occasioned by baking of the japanned finish. They are now finished and ready for use.

It will be apparent that the above described method of making pinking shears is rapid and efficient. Moreover, the shears thus produced have accurately shaped teeth which mesh without clashing and which cut cleanly and easily.

There have thus been provided methods of and means for accomplishing the aforementioned and other obvious desirable objectives.

As many possible embodiments may be made of the above invention, and as many changes might be made in the embodiment above described, all matter herein set forth or shown in the accompanying drawings is to be inter-

We claim:

1. A method of making one of a pair of pinking shears which comprises forming a shear blank having a hub portion with a pivot hole therethrough and a jaw portion formed with a flange extending from said jaw generally parallel to the axis of said pivot hole and forming teeth in said flange by rotating said jaw about said axis through tangential engagement with a cylindrical cutting tool having circumferential serrations while axially rotating said tool.

2. A method of making one of a pair of pinking shears including forming a shear blank having a hub portion with a pivot hole therethrough and a jaw portion comprising a flat blade with an integral flange extending from one edge thereof generally parallel to the center line of said pivot hole, and moving said blank back and forth about said center line tangentially against a cylindrical cutting tool having circumferential linearly arranged serrations while axially rotating said tool to form in said flange teeth having arcuate faces the common axis of which is said center line.

3. A fixture for holding a pinking shear blank during cutting of the teeth therein, said fixture including a base adapted to be mounted on the rotary table of a milling machine, a bracket on said base having a surface facing said base and a pin projecting from said surface toward said base adapted to receive the pivot hole in the hub portion of said blade, a jack reciprocable toward and from said surface and adapted to clamp the bearing face of said hub portion against said surface, and clamping means for securing the jaw portion of said blade.

4. A method of making a pair of pinking shears including forming a pair of shear blanks which are identical except for their handles, each blank having a hub portion with a pivot hole extending therethrough and a jaw portion comprising a flat blade with an integral flange extending from one flat surface thereof and adjacent an edge, rotating each of said blanks about its axis with said flange moving tangentially against a serrated cylindrical cutting tool while axially rotating said tool, said tool including rows of substantially triangular-shaped cutting teeth to form similarly shaped grooves in said flange and mounting the blades thus formed to pivot about a common axis which is the center of the pivot holes formed therein so that the edges of the teeth on said flanges intermesh.

5. A method of making one blade of a pair of pinking shears including forming a shear blank having a hub portion with a pivot hole therethrough and a jaw portion comprising a substantially flat blade with an integral flange extending from one of its flat surfaces adjacent an edge thereof and generally parallel to the center line of said pivot hole, relating said blank to a cylindrical cutting tool having a serrated cutting surface so that the cylindrical axis of the tool and a projection of said center line of the pivot hole intersect and with said flange extending toward the cutting surface of said tool, and swinging said blank about said center line as an axis while rotating said tool so that said tool comes into cutting engagement with said flange.

6. A method of making one blade of a pair of pinking shears including forming a shear blank having a hub portion with a pivot hole therethrough and a jaw portion comprising a substantially flat blade with an integral flange extending from one of its flat surfaces adjacent an edge thereof and generally parallel to the center line of said pivot hole, relating said blank to a cylindrical cutting tool having linearly arranged circumferentially spaced rows of triangularly shaped cutting teeth pointing toward their apexes in such manner that the cylindrical axis of the tool and a projection of said center line of the pivot hole intersect and with said flange extending toward said teeth, and swinging said blank back and forth about said center line as an axis while rotating said tool so that said teeth cut similarly shaped notches in said flange.

7. A method of making one blade of a pair of pinking shears including forming a shear blank having a hub portion with a pivot hole therethrough and a jaw portion comprising a substantially flat blade with an integral flange extending from one of its flat surfaces adjacent an edge thereof and generally parallel to the center line of said pivot hole, arranging said blank with said center line vertically disposed for swinging movement thereabout tangentially to a horizontally rotatable cylindrical cutting tool having a serrated cutting surface so that the axis of rotation of the tool and a projection of said center line intersect and with said flange extending toward the cutting surface of said tool, and swinging said blank about said center line as an axis while said tool is rotating whereby said tool forms teeth in said flange.

8. A method of making one blade of a pair of pinking shears including forming a shear blank having a hub portion with a pivot hole therethrough and a jaw portion comprising a substantially flat blade with an integral flange extending from one of its flat surfaces adjacent an edge thereof and generally parallel to the center line of said pivot hole, relating said blank to a cylindrical cutting tool having a serrated cutting surface so that the cylindrical axis of the tool and a projection of said center line of the pivot hole intersect and with said flange extending toward the cutting surface of said tool, swinging said blank back and forth about said center line as an axis while rotating said tool to form teeth in said flange, and grinding the top surfaces of said teeth so that the planes thereof form acute angles with said surface of said jaw portion.

9. A method of making a pair of pinking shears including forming a pair of shear blanks having a hub portion with a pivot hole therethrough and a jaw portion comprising a substantially flat blade with an integral flange extending from one flat surface thereof and adjacent an edge thereof and generally parallel to the center line of said pivot hole, relating each of said blanks in turn to a cylindrical cutting tool having a serrated cutting surface so that the cylindrical axis of the tool and a projection of said center line intersect and with said flange extending toward the cutting surface of said tool, and swinging each of said blanks in turn about said center line as an axis while rotating said tool so that said tool forms a row of teeth in said flange, grinding the top surface of said teeth at an acute angle to said surface of said blade, and assembling said blades to pivot about said center line so that said teeth intermesh and the ground portions thereof form cutting surfaces.

10. A method of making a pair of pinking shears including forming a pair of shear blanks having a hub portion with a pivot hole therethrough and a jaw portion comprising a substantially flat blade with an integral flange extending from one surface thereof adjacent an edge and generally parallel to the center line of said pivot hole, relating a first one of said blanks to a cylindrical cutting tool having linearly arranged circumferentially spaced rows of triangularly shaped teeth pointing toward their apexes so that said flange extends toward said teeth, swinging said blank about the said center line as an axis tangentially of said tool while rotating said tool to form a row of triangularly shaped teeth in said flange, relating the second one of said blanks to said tool so that it is linearly spaced with respect to the axis of the tool a distance equal to one-half of the length of the base of one of said last-mentioned teeth and with its flange extending toward said tool, swinging said last mentioned blank about its said center line as an axis while rotating said tool to form teeth in the flange thereof similar in shape and dimension to the teeth of the first blank, and assembling said blanks for pivotal movement about said center line as an axis so that said teeth intermesh for cutting action.

BERT G. CARLSON.

REFERENCES CITED

The following references are of record in the file of this patent:

UNITED STATES PATENTS

| Number | Name | Date |
|---|---|---|
| 24,172 | Wood | May 24, 1859 |
| 421,896 | Bergstrom | Feb. 25, 1890 |
| 1,732,132 | Marshall | Oct. 15, 1929 |
| 1,959,190 | Wyner et al. | May 15, 1934 |
| 2,212,999 | Faulder | Aug. 27, 1940 |
| 2,222,034 | Jackson | Nov. 19, 1940 |
| 2,286,874 | Schwartz | June 16, 1942 |
| 2,353,096 | Weidauer | July 4, 1944 |
| 2,367,850 | Dusevoir | Jan. 23, 1945 |
| 2,430,984 | Hopkins | Nov. 18, 1947 |